Nov. 12, 1929.　　　E. F. MAAS　　　1,735,689
SQUEEGEE APPLIER
Filed Dec. 12, 1925　　　3 Sheets-Sheet 1

Inventor
Elov. F. Maas.
By O. E. Bee
Attorney

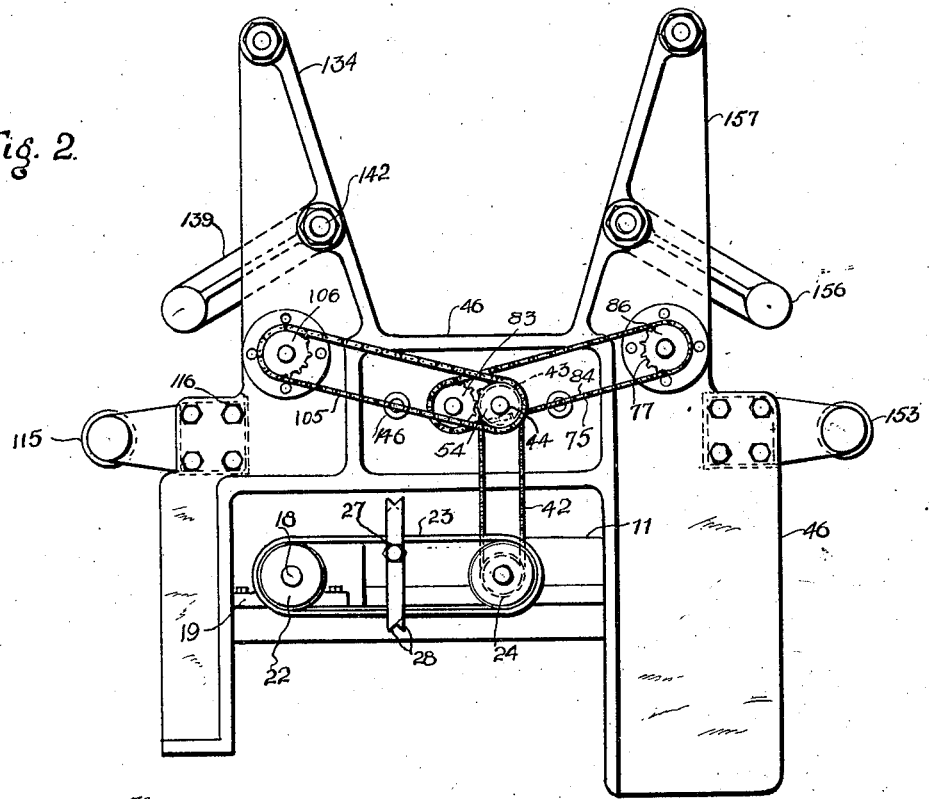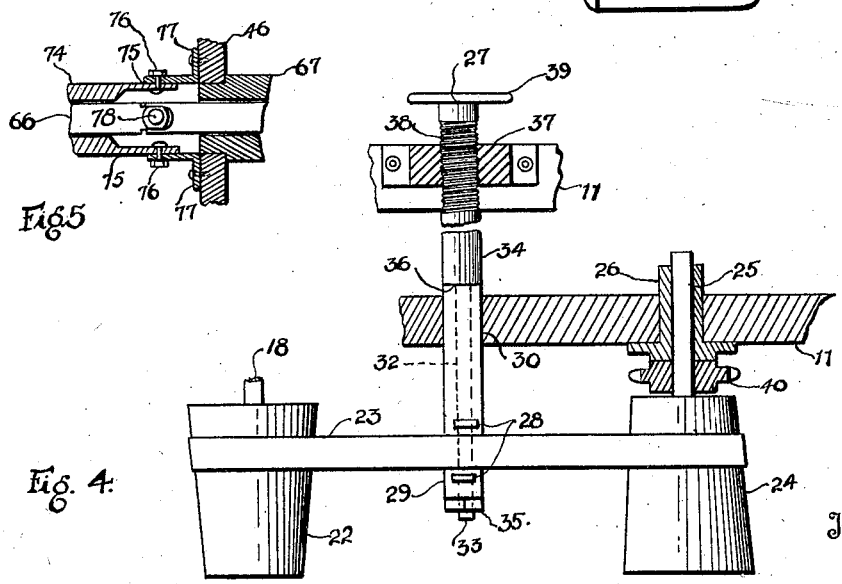

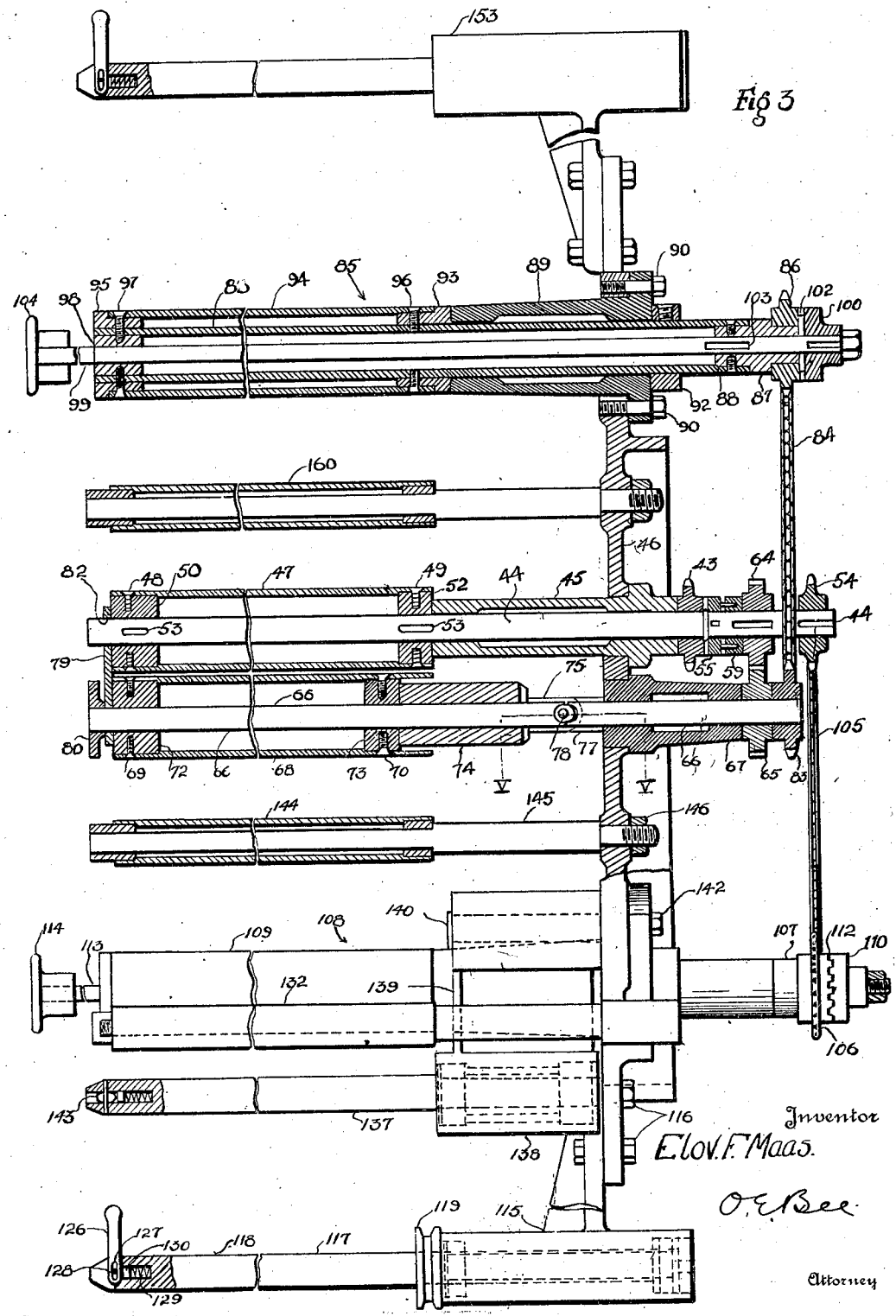

Patented Nov. 12, 1929

1,735,689

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

SQUEEGEE APPLIER

Application filed December 12, 1925. Serial No. 75,145.

My invention relates to machines employed in the manufacture of rubberized fabric plies for building pneumatic tire casings and it has particular relation to an apparatus adapted to facilitate the application of gum strips or squeegees to such plies.

One object of my invention is to provide an apparatus which will separate a gum strip or squeegee from a fabric liner and will apply the gum strip to a strip of rubberized fabric as the latter travels upon an endless conveyer belt.

Another object of my invention is to provide an attachment for a band building machine which is adapted to be operated by the machine and which uniformly feeds a strip of rubber compound along the surface of a strip of tire building material as the latter travels upon an endless conveyor belt.

In the manufacture of pneumatic tire casings one method now employed in preparing rubberized fabric plies therefor consists in splicing the ends of bias cut fabric stock upon endless conveyor belts, thereby providing relatively long strips which are fed continuously upon an additional conveyor belt, and which are then marked and cut to proper lengths. Usually two plies of the stock are simultaneously fed upon the last named conveyor belt and stitched together by apparatus carried by the conveyor in order to provide double ply stock. A band building machine provided with conveyor belts of the type referred to, is fully described in my co-pending application, Serial No. 25,554, filed April 24, 1925.

In conjunction with the preparation of fabric tire building stock of the type designated, it is often desirable to apply a strip of rubber compound between the plies, which strip is known in the tire building art as a squeegee, and which provides a firm bond between the plies and prevents friction between the cords in the respective plies of cord fabric.

My present invention is directed to the provision of a device adapted to operate in conjunction with a band building machine and is designed for the purpose of uniformly applying a squeegee to a strip of fabric tire building stock. An apparatus embodying my invention consists of a number of rollers and roller supports, which are operated by driving members connected to the operating parts of a band building machine. A roll of fabric liner material, provided with a squeegee rolled therein, is rotatably mounted upon one of the supports, the squeegee being separated from the liner while the squeegee is being fed between rollers to the fabric stock carried by the conveyor. The liner is rewound upon another rotatable member carried by the frame work of the machine. Two sets of rollers are employed in order that a fresh roll of material may be positioned upon the device while another is being fed to the moving strip on the conveyor belt.

For a better understanding of my invention, reference may now be had to the accompanying drawings forming a part of this specification, of which;

Fig. 2 is a rear elevational view of the apparatus embodying my invention, parts of the band building machine being omitted for the sake of clearness;

Fig. 3 is a fragmentary view on an enlarged scale, partially cross-sectional and partially plan, illustrating the principal operating elements of the apparatus embodying my invention;

Fig. 4 is a fragmentary view on an enlarged scale partially cross-sectional and partially plan, illustrating details of the driving mechanism comprising a portion of my invention;

Fig. 5 is a fragmentary cross-sectional view illustrating a hinge and universal joint connection employed in conjunction with one of the roller members, included in my invention, the view being taken substantially along the line V—V of Fig. 3.

Figure 1:
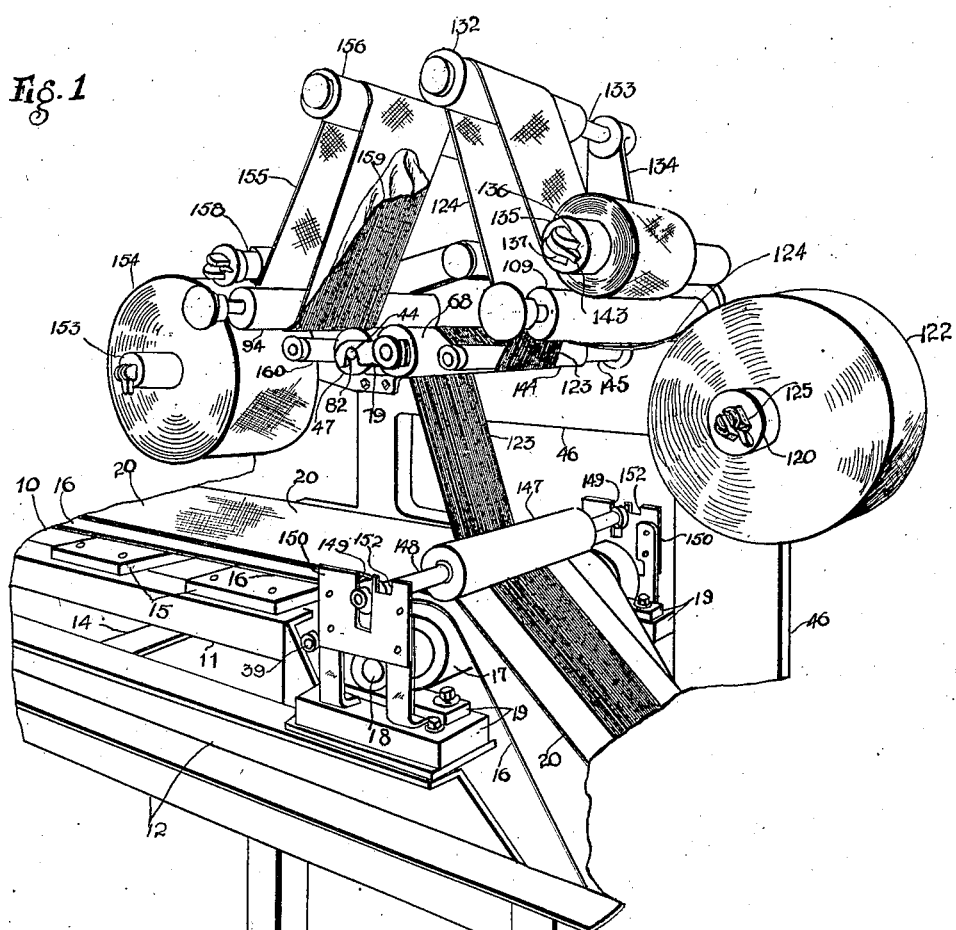
Fig. 1 is a fragmentary perspective view of a band building machine and an apparatus embodying my invention mounted thereon.

One practical embodiment of my invention, as shown in the accompanying drawings, is adapted to operate in conjunction with a band building machine, a portion of which is generally indicated by the numeral 10. I have illustrated horizontal frame members 11 and 12 and upright frame members 13 reinforced by transversely extending members 14 and 15, the latter serving as a means for horizontally supporting the intermediate portion of a driven conveyor belt 16. The conveyor belt operates over a roller pulley 17, which is provided with a shaft 18 mounted in brackets 19, secured to each side of the frame of the band building machine. As the conveyor belt travels along the top of the band building machine, it carries therewith a ply of rubberized fabric tire building stock 20, which is fed to another conveyor belt (not shown). The specific operation and arrangement of the conveyor belts is fully described in my copending application above referred to and accordingly, no further description thereof is necessary in this application, because the showing of one conveyor belt is sufficient for a thorough understanding of the relationship between my invention and the band building machine.

The shaft 18 supporting the roller 17 extends beyond one of the journal brackets 19 at the side of the band building machine and has fixedly mounted thereon a truncated cone pulley 22 (Fig. 4), which drives a belt 23, trained thereabout, and disposed over a second truncated cone pulley 24 mounted upon a stub shaft 25. This stub shaft is rigidly secured to the pulley 24, and is journalled within an elongate flanged bearing sleeve 26 secured to one of the frame members 11.

It will be observed that the truncated cone pulleys 22 and 24 are so arranged that the surface slope of the one extends in a direction opposite to that of the other.

In order to maintain the belt 23 in various positions upon the pulleys, I provide an adjusting guide 27, which includes vertical fingers 28 rigidly secured to an end portion 29 of the guide. The end portion 29, which is square in cross-section, is adapted to slide through a square opening 30 in the frame member 11, and is provided with a central bore 32, which receives a reduced portion 33 of a rotatable rod 34. One end of the rod 34 is provided with a nut 35, which bears against the outer end of the slidable end portion 29 of the guide, while the other end of the slidable portion abuts against a shoulder 36 of the rod 34. A screw threaded bracket 37 secured upon the frame 11 receives a screw threaded portion 38 of the rod 34 and a hand wheel 39 is rigidly secured to the end of the rod, the turning of which will move the fingers 28 in a horizontal direction, to move the belt 23 laterally, thus varying the rate of rotation of the pulley 24 with respect to the pulley 22.

The pulley shaft 25 rigidly supports a sprocket wheel 40, which operatively engages a sprocket chain 42 extending upwardly and trained about a sprocket wheel 43 rotatably mounted upon a shaft 44. A sleeve bearing 45 rigidly secured in a frame member 46 carried by the band building machine, supports the shaft 44. One end of the shaft 44 is provided with a roller member 47 secured respectively, by means of screws 48 and 49 to collars 50 and 52, the latter of which are keyed to the shaft, as indicated at 53. The other end of the shaft 44 extends beyond the frame member 46 and rigidly supports a sprocket wheel 54, the function of which will presently be described.

Figure 6:
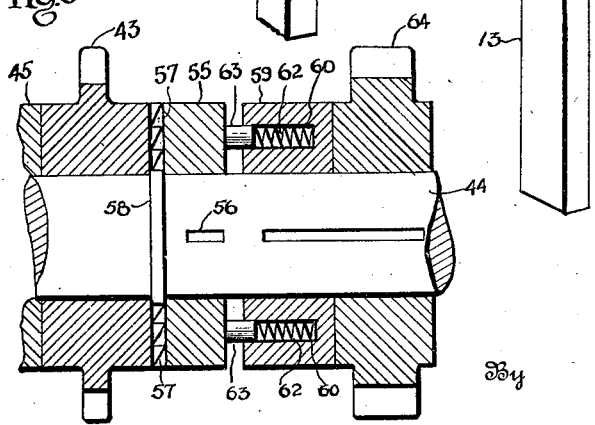
Fig. 6 is a cross-sectional view on an enlarged scale illustrating in detail a ratchet clutch mechanism constituting a part of my invention.

As best shown in Fig. 6, a ratchet clutch member 55 is splined upon the shaft 44, as indicated at 56, and interfitting ratchet teeth 57 on the clutch and on the sprocket wheel 43 provide a positive drive from the sprocket wheel to the shaft 44. A circumferential bead 58 on the shaft maintains the sprocket wheel in proper poistion between the abutting end of the sleeve 45 and the clutch member 55. A collar member 59 rigidly mounted upon the shaft 44 is provided with a plurality of bores 60, which are adapted to receive compression springs 62, and pins 63. The pins 63, under pressure of the springs, urge the slidably keyed clutch member 55 into engagement with the clutch face of the sprocket wheel 43, thereby maintaining the ratchet teeth 57 in operative engagement with each other. It will be observed from this construction that the shaft 44 is adapted to be driven in one direction by the sprocket wheel 43, but in the event that the shaft itself is rotated in the direction in which the sprocket wheel is driven, while the latter is idle, the beveled portions of the ratchet teeth 57 will slide upon each other, and thus relative rotation of the shaft 44 and the sprocket wheel 43 may be effected.

Beside the collar 59, a gear wheel 64 rigidly secured to the shaft 44 intermeshes with a second gear wheel 65 of equal size therewith rigidly secured to a shaft 66. A sleeve bearing 67 secured to the frame 46 rotatably supports the shaft 66, the latter being disposed adjacent and parallel to the shaft 44. A roller member 68 is rigidly mounted upon the shaft 66 in the same manner as the roller member 47 is mounted upon the shaft 44, that is, by means of screws 69 and 70, and collars 72 and 73.

As best shown in Figs. 3 and 5, the shaft 66 is provided with a sleeve member 74, one end of which abuts against the collar 73 and the other end of which is provided with integral diametrically opposite projections 75, hinged upon bolts 76, which are secured to two brackets 77, secured to the frame 46. The shaft 66 is provided with a universal joint 78, which is in alignment with the axes of the bolts 76, thus permitting the end of the shaft, which carries the roller 68, to be swung in a horizontal direction away from the roller 47 without interfering with the rotation of either roller.

In order to maintain the rollers 47 and 68, which may be designated as bite-rollers, in close relationship with each other, a latch 79 pivotally mounted adjacent the end of the shaft 66 is held in place by means of a rigidly mounted disk cap member 80, and is provided with a notch 82, which engages the shaft 44 adjacent the end thereof.

At the end of the shaft 66 and rigidly secured adjacent the gear wheel 65, is a sprocket wheel 83, which operates a sprocket chain 84, the latter extending horizontally on each side of the shaft 44 and is adapted to drive a roller device, indicated generally by the numeral 85. The chain 84 operatively engages a sprocket wheel 86 rotatably mounted upon a collar 87, which is rigidly secured to a tubular shaft 88. A sleeve bearing 89 bolted, as indicated at 90, to the frame 46, abuts a collar 92, rigidly secured to the tubular shaft, the end portions of the sleeve 89 providing journal bearings for the tubular shaft 88. The inner end of the sleeve 89 bears against a collar 93, which supports one end of a roller 94. The other end of the roller is supported at the end of the tubular shaft by means of a collar 95. Screws 96 and 97 rigidly secure the roller to the collars 93 and 95, respectively, and to the tubular shaft 88.

The end of the tubular shaft 88, which carries the collar 95, has disposed therein and rigidly secured thereto a bearing bushing 98, which slidably supports a rod 99. One end of the rod rigidly supports a clutch member 100, and interfitting teeth 102 on the clutch member and on the sprocket wheel 86 provide a driving connection therebetween. The rod 99 is slidably keyed within the collar 87, as indicated at 103. Thus a positive drive is effected from the chain 84 to the rotatable tubular shaft 88. By manipulating a knob 104, secured to the end of the rod 99, the clutch member 100 may be disengaged from the sprocket wheel 86, and the latter will then rotate idly upon the collar 87.

The sprocket wheel 54 operatively carries a chain 105, which is trained over a sprocket wheel 106, journalled on a collar 107, similar to the collar 87, and is adapted to drive a roller device 108, the latter being provided with a roller 109, the device 108 being identical in construction with the roller device 85. In this instance a clutch member 110 and the sprocket wheel 106 are provided with interfitting clutch teeth 112, which are engaged and disengaged by manipulating a rod 113 slidable through the roller device 108, and operating in exactly the same manner as the rod 99. A cap member 114 is provided at the end of the rod 113 for convenience in operating the clutch mechanism.

It will be observed from the foregoing description that either one of the roller devices 85 or 108 may be idle while the other is operating or that the operation of both may be stopped by manipulating the respective rods 99 and 113. Also, the rollers 47, 68, 94, and 109 are of substantially the same size and are driven at the same rate of speed.

One side of the frame 46 is provided with a bracket bearing member 115 rigidly bolted thereto, as indicated at 116, and is adapted to rotatably receive a spool support 117. The outer portion 118 of the spool support is square in cross-section and an intermediate portion thereof is provided with a collar 119 abutting the end of the bracket 115. A spool 120 (Fig. 1) supports a roll 122 composed of a relatively long strip of rubber compound or squeegee 123 protected within the rolls of a fabric liner 124, the spool being provided with an opening 125 which receives the outer square portion of the spool support 117. The end 118 of the spool support 117 is bifurcated, and supports a latch 126, one end of which is slotted at 127 and receives a pin 128, extending through the bifurcated ends of the support. A spring 129 and dog 130 exert pressure against the latch and maintain it at right angles to the spool support 117 to prevent the spool 120 from being displaced, and permit the latch to be swung about to a position in alignment with the spool support to facilitate removing the spool 120 from the support.

As best shown in Fig. 1, the liner 124 carrying the squeegee 123 passes beneath the roller 109, and the liner passes upwardly therefrom to a roller 132, rotatably mounted upon a shaft 133, the latter being rigidly secured to the top of a standard 134 forming a part of the frame 46. From this roller 132, the liner passes downwardly, and is adapted to be rewound upon a spool 135 provided with a squared opening 136 which fits over a roller support 137, rotatably mounted in a bearing 138 forming an end portion of a hinged member 139 (Fig. 3). The other end of the hinged member is journaled upon a shaft 140 rigidly secured to the frame 46, as indicated at 142. A latch 143, which corresponds in structure and operation exactly to the latch 126, prevents the spool 135 from slipping from the end of the support 137 during operation of the apparatus. By force of gravity, the roller support 137 swings the roller 135 into engagement with the roller 109, and as the latter rotates at the same rate of speed as the rollers 47 and 68, the liner which engages the periphery of the roller 109 is uniformly rewound upon the roller 135.

Adjacent the roller 109 the squeegee 123 is separated from the liner 124 and engages the lower side of an idling roller 144 journaled upon a shaft 145, which, in turn, is rigidly secured to the frame 46 by means of a screw-threaded nut 146. The squeegee is then guided between the bite-rollers 47 and 68 and passes downwardly into engagement with the surface of the rubberized fabric stock 20. It will be noted that the roller 68 may be swung away from the roller 47 about the hinge bolts 76, and the universal joint 78, while the squeegee is being positioned therebetween after which operation, the latch 79 is engaged with the shaft 44 to hold the rollers in proper operative position.

During the positioning of the squeegee upon the roller members, as above described, it is to be understood that the band building machine is not operating the conveyor belt 16. After the squeegee is positioned between the rollers 47 and 68, and the latch member 79 is secured in operative position, the operator may rotate the roller 68 by manually turning the disc cap member 80 and thus a sufficient length of squeegee may be drawn between the rollers to properly position it upon the conveyor belt. While the operator turns the cap member 80, the ratchet teeth 57 of the clutch member 55 (Fig. 6) and the sprocket wheel 43, will slide upon each other without turning the sprocket wheel 43. Also, this operation is advantageous in the event that the squeegee becomes slack during operation of the band building machine. Under such conditions, the operator may momentarily stop operation of the band building machine and adjust the squeegee to its proper position.

A gravity roller 147 functions to stitch the squeegee to the strip of fabric stock 20, and is provided with a shaft 148 slidably mounted in slots 149 cut in brackets 150. The brackets 150 are rigidly secured to the bearing brackets 19 and also are provided with notches 152 in which the shaft may rest when the roller is lifted out of engagement with the squeegee 123 and the fabric strip 20.

A spool support 153 mounted on the opposite side of the frame 46 from the spool support 115 supports a liner roll 154, and is of the same structure and operates in exactly the same manner as the spool support 115. Also a liner 155 forming a part of the roll 154 is trained under the roller 94 and over a roller 156 carried by a standard 157, and is rewound upon a rotatable spool support 158. Each of the elements 156 and 158 respectively corresponds exactly as to structure and function to roller 132 and rotatable spool support 137. Likewise a squeegee 159 rolled in the liner 155 is adapted to be trained beneath a roller 160, which corresponds to the roller 144, and between the rollers 47 and 68.

Two sets of liner supports and rewinding devices are provided in order to prevent loss of time in positioning new rolls of material upon the machine after one roll has been exhausted. It is to be understood that the gearing mechanism operated from the pulleys 22 and 24 to the rollers 47 and 68 and to the roller devices 85 and 108 is so arranged that the peripheral speed of these roller elements and the speed of the rubberized fabric stock 20 upon the conveyor belt is the same. If any variations occur in this speed, it may be corrected by adjusting the guide device 27, thereby varying the speed of the pulley 24 with respect to the pulley 22. Or in the event adjustment of the squeegee, as above stated, is required the cap member 80 may be manipulated to manually turn the rollers without operating the sprocket wheel 43. Thus it will be apparent that the squeegee will be uniformly applied to the strip of rubberized fabric while the liners 124 or 155 will be unwound at the same rate of speed from either of the spool supports 125 or 153, and rewound at such rate of speed on either of the spool supports 137 or 158.

From the foregoing description, it will be apparent that my invention efficiently solves the problem of properly applying a rubber cushion strip or squeegee to strips of rubberized fabric stock, and that the mechanism embodying my invention is so constructed that a relatively small amount of time and labor is required for its operation and care.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. An apparatus comprising a pair of rollers operatively geared together, means for driving the rollers, a plurality of rotatable members mounted in spaced relation to the rollers, driving connections between each rotatable member and the rollers, and a clutch mechanism operatively associated with each of the driving connections.

2. An apparatus comprising a pair of rollers operatively geared together, a variable speed driving mechanism for the rollers, a rotatable member provided with a sprocket chain connection to one of the rollers, and a releasable clutch mechanism associated with the sprocket chain connection adapted to control operation of the rotatable member.

3. An apparatus comprising a pair of rollers operatively geared together, means for driving the rollers, a rotatable member adjacent the rollers, means for driving the rotatable member from the rollers, a clutch mechanism operatively associated with the driving means, and a roller supported by a hinged mounting for engaging the rotatable member by force of gravity.

4. An apparatus comprising a pair of rollers operatively geared together, means for driving the rollers a one way clutch mechanism operatively connected between the rollers and the driving means, for permitting rotation of the rollers independently of the driving means, a plurality of rotatable members adjacent the rollers, and means for driving the members from the rollers.

5. An apparatus comprising a pair of rollers operatively geared together, means for driving the rollers, a clutch device operatively associated with the rollers and the driving means, for permitting rotation of the rollers in one direction without operating the driving means, a plurality of rotatable members adjacent the rollers, and driving connections including clutch mechanisms between each rotatable member and the rollers.

6. An apparatus comprising a pair of rollers operatively geared together, means for driving the rollers, a spring pressed ratchet clutch device operatively associated with the rollers and the driving means, for permitting rotation of the rollers in one direction without operating the driving means, a plurality of rotatable members adjacent the rollers, and driving connections including selectively operable clutch mechanisms between each rotatable member and the rollers.

7. An apparatus comprising a pair of rollers operatively geared together, an oppositely disposed pair of truncated cone pulleys for driving the rollers, means for varying the relative rotative speed of the pulleys, a ratchet clutch mechanism operatively arranged between the pulleys and the rollers permitting rotation of the rollers in one direction independently of the operation of the pulleys, a plurality of rotatable members each provided with a sprocket chain connection to one of the rollers, and a releasable clutch mechanism associated with each sprocket chain connection.

8. An apparatus comprising means for supporting a liner roll having a rubber compound strip rolled therein, positively driven means for unwinding and separating the liner and the rubber strip, means for applying the rubber strip to a moving band, and means for regulating the speed of the rotatable members.

9. A band applying apparatus comprising a means for supplying a strip of liner material supporting a plastic band, a roller engaged by one of the last mentioned elements, means beyond the roller for separating the liner and the band, and means driven by frictional engagement with the roller for winding the liner spirally.

10. A band applying apparatus comprising a means for supplying a strip of liner material supporting a plastic band, a roller engaged by one of the last mentioned elements, means beyond the roller for separating the liner and the band, a second roller disposed in parallel relation to the first for receiving the liner from the latter, and means driven by frictional engagement with the roller for winding the liner spirally.

11. A band applying apparatus comprising a means for supplying a strip of liner material supporting a plastic band, a roller engaged by one of the last mentioned elements, means beyond the roller for separating the liner and the band, a second roller disposed in parallel relation to the first for receiving the liner from the latter and a winding reel for receiving the liner from the last mentioned roller, said reel being rotatably supported in frictional engagement with the first mentioned roller by a pivoted arm.

In witness whereof, I have hereunto signed my name.

ELOV F. MAAS.